United States Patent [19]
Lotz et al.

[11] Patent Number: 5,784,587
[45] Date of Patent: Jul. 21, 1998

[54] METHOD AND SYSTEM FOR RECOVERING FROM CACHE MISSES

[75] Inventors: Jonathan P. Lotz; Gregg B. Lesartre; Donald M. Kipp, all of Fort Collins, Colo.

[73] Assignee: Hewlett-Packard Company, Palo Alto, Calif.

[21] Appl. No.: 663,337

[22] Filed: Jun. 13, 1996

[51] Int. Cl.$^6$ ........................................... G06F 12/02
[52] U.S. Cl. ...................................................... 395/392
[58] Field of Search ........................ 364/DIG. 1, DIG. 2; 395/392, 390, 391, 393, 394, 395; 711/100, 101, 117, 118, 133, 134, 135, 136

[56] References Cited

U.S. PATENT DOCUMENTS 5,655,096  8/1997  Branigin .................................. 395/376
5,666,506  9/1997  Hesson et al. ......................... 395/392

Primary Examiner—Robert B. Harrell

[57] ABSTRACT

A recovery method for each instruction in an instruction queue comprises steps of monitoring a launch bus to determine when an instruction has executed and comparing the tag number of the launched instruction with the tag numbers of the instructions upon which the instruction in the queue depends. After all dependencies for the instruction in the queue have cleared, a flag is set to indicate that the instruction is ready to launch. Even though all dependencies have cleared and the flag is set, the instruction in the queue still monitors the tag bus to check whether an instruction upon which it depends ever reexecutes. In the case that the instruction does reexecute, the instruction in the queue once again sets its flag to indicate that it is ready to launch, whereby the instruction in the queue will also reexecute. The recovery method permits the queue to operate at an optimal speed since each instruction need not wait until it is known for certain that its data will arrive before executing but rather may speculatively execute. Further, the recovery method does not require additional complex hardware but instead employs existing circuitry to monitor the reexecution of instructions.

8 Claims, 7 Drawing Sheets

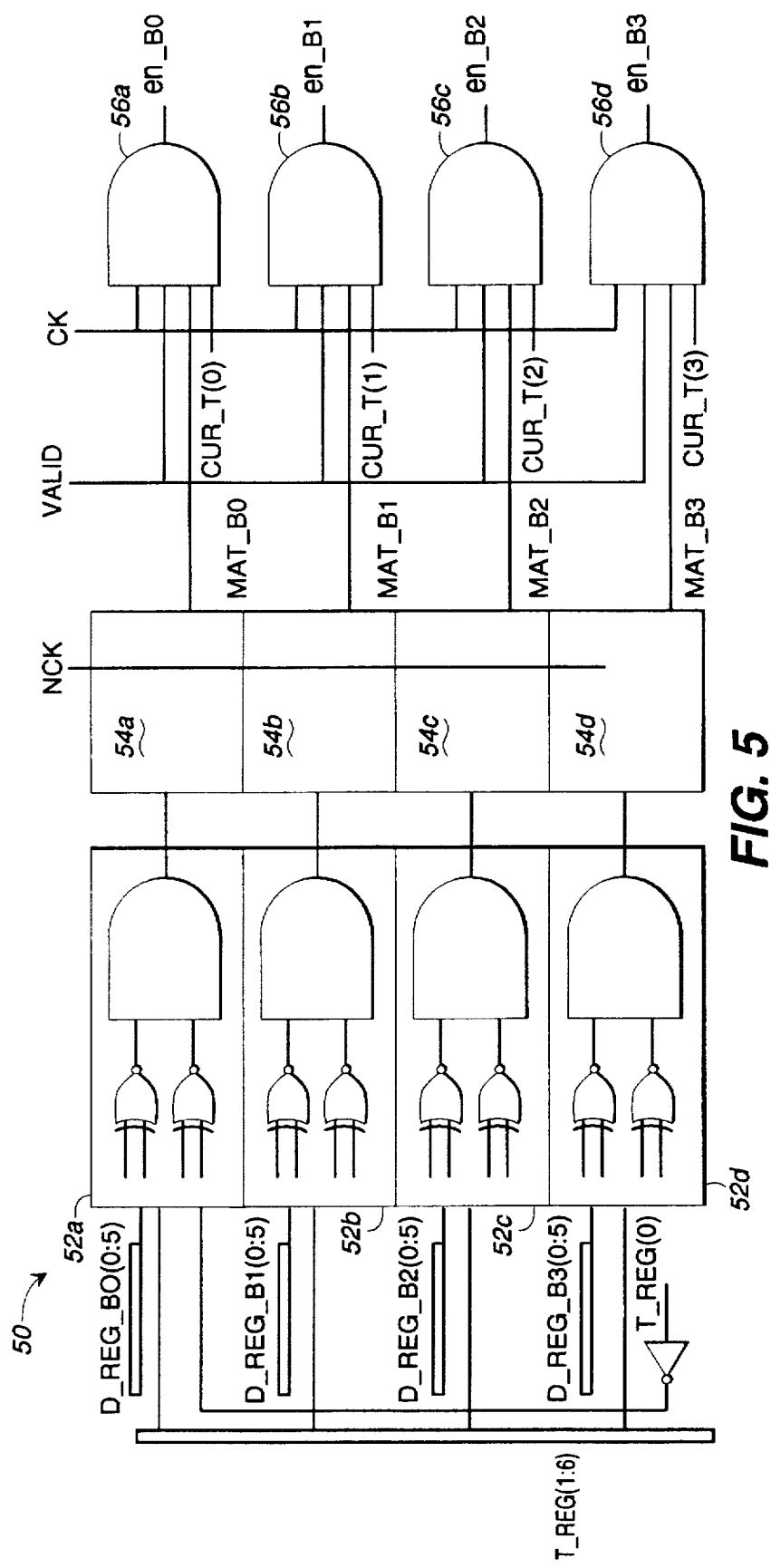

METHOD AND SYSTEM FOR RECOVERING FROM CACHE MISSES

BACKGROUND OF THE INVENTION

1. Field of the Invention

The present invention generally relates to a method and system for recovering from cache misses and, more particularly, to a method and system for recovering from cache misses in an out-of-order execution machine.

2. Description of the Prior Art

In an out-of-order execution machine having an instruction queue, instructions are fetched into the queue in program order and are also retired from the queue in program order. The launching or execution of these instructions, however, may occur out-of-order, in other words in an order other than the program order. Before an instruction can launch, data for that instruction must be available. To ensure that the data will be available, the launching of an instruction may be delayed for one or more states until it is known for certain that the data from a cache access has arrived. In this manner, a complex recovery mechanism for cache misses is not required.

Rather than delaying the launching of the instruction until the data has arrived, the instruction may launch on the assumption or speculation that the data will arrive in time. By eliminating the one or more states during which the instruction waits for data, the performance of the machine can be substantially increased.

When an out-of-order machine operates on the assumption that data will arrive in time, the out-of-order machine must have some type of recovery mechanism to handle the cache miss occasions when the data does not arrive in time for the launching of an instruction. The recovery mechanism typically involves extra hardware gates and other circuitry and may even affect some critical timing paths within the machine. These extra hardware gates and other circuitry must not only recover the instruction that missed but also relaunch or reexecute any subsequent instructions which were dependent upon the missed instruction. A recovery mechanism therefore significantly complicates the design and operation of the machine.

SUMMARY OF THE INVENTION

An object of the present invention is to provide a recovery method and system which can provide optimal performance for an instruction queue.

Another object of the present invention is to provide a recovery method and system which does not require a significant amount of additional logic gates or other hardware.

Additional objects, advantages, and novel features of the invention will be set forth in the description which follows, and will become apparent to those skilled in the art upon reading this description or practicing the invention.

To achieve the foregoing and other objects, a recovery method according to a preferred embodiment of the invention comprises the steps of executing a first instruction and driving a first tag number identifying the first instruction on a tag bus. The first tag number is compared to a priority tag number for a second instruction in one of the slots of a queue of instructions waiting to execute. The priority instruction is an instruction which provides data for the second instruction. If the first tag number is equal to the priority tag number, a dependency flag associated with the second instruction is cleared. After all dependencies for the second instruction have cleared, a launch ready flag is set to indicate that the second instruction is ready to launch. The method loops back so that the launch ready flag is set again if the priority instruction is ever reexecuted.

With the invention, a cache access is capable of having an optimal performance since each instruction need not wait until it is known for certain whether data for the instruction has arrived but rather can execute speculatively. The recovery method according to the invention also does not require a significant amount of additional logic gates or other circuitry but instead relies upon existing circuitry to monitor whether a priority instruction has relaunched.

BRIEF DESCRIPTION OF THE DRAWINGS

The accompanying drawings, which are incorporated in, and form a part of, the specification, illustrate preferred embodiments of the present invention and, together with the description, serve to explain the principles of the invention. The drawings are not necessarily to scale, emphasis instead being placed upon clearly illustrating the principles of the invention. In the drawings:

FIG. 4 is a representative diagram of a memory elements constituting a slot in an instruction queue;

FIG. 5 is a circuit schematic for determining dependencies between instructions;

DETAILED DESCRIPTION OF THE PREFERRED EMBODIMENT

Figures 1, 2:
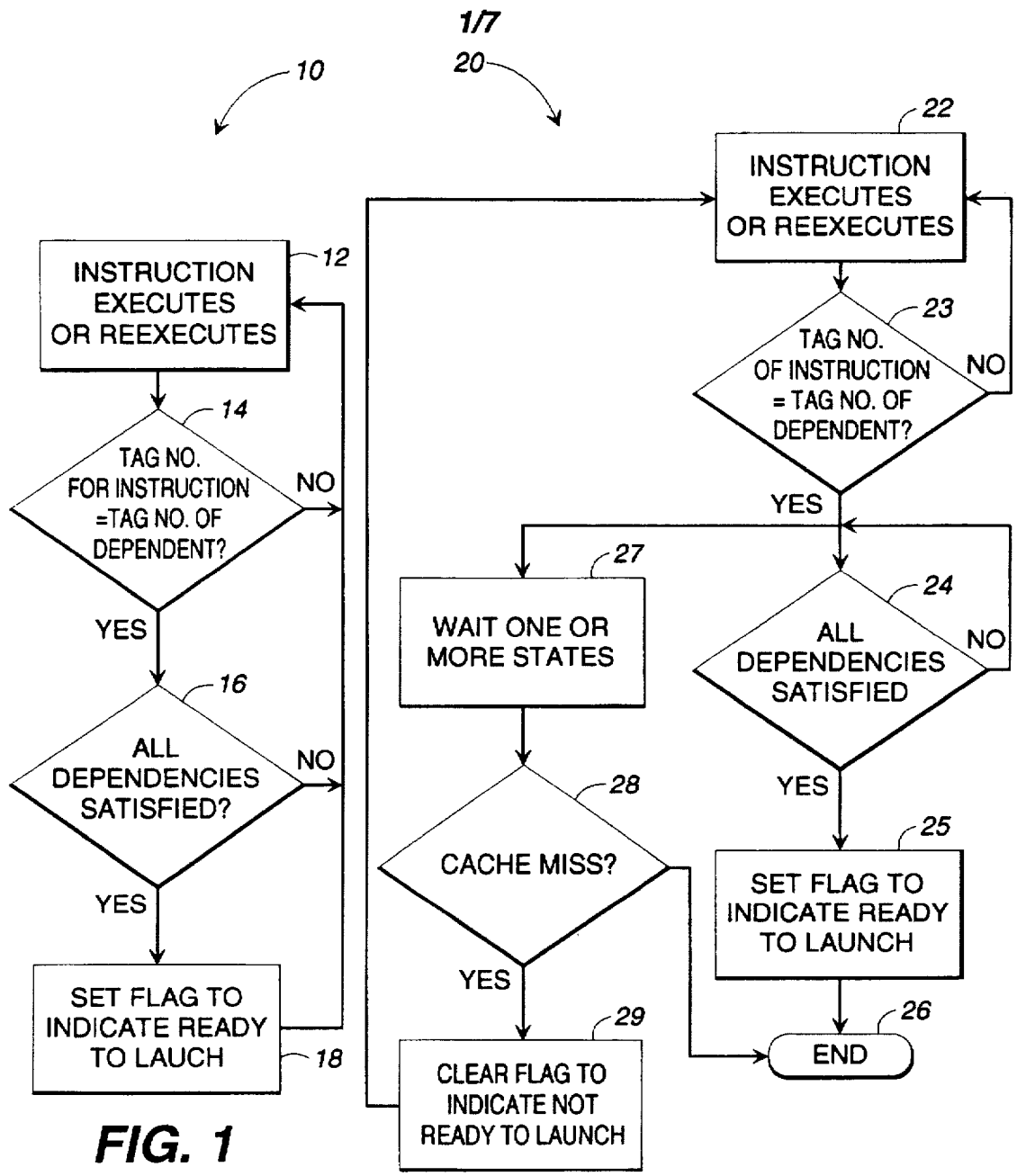
FIG. 1 is a flow chart illustrating a recovery method according to a first embodiment of the invention.
FIG. 2 is a flow chart illustrating a recovery method according to a second embodiment of the invention.

Reference will now be made in detail to the preferred embodiment of the invention. With reference to FIG. 1, a recovery method 10 according to a first embodiment of the invention is preferably used in conjunction with an out-of-order execution machine and, more precisely, with the Hewlett-Packard PA-8000 microprocessor. The out-of-order execution machine both fetches instructions into an instruction queue and retires instructions from the queue in a program order but is capable of launching instructions out-of-order. One limitation to the order of launching is that an instruction which is dependent upon other instructions for its data cannot execute before these other instructions. Thus, during operation, each instruction must be kept informed as to whether the instruction upon which it is dependent has launched. For the purposes of this description, an instruction upon which another instruction depends will be termed a priority instruction relative to that other instruction.

The instruction queue in the out-of-order execution machine is comprised of a number of slots with each slot having a unique number and capable of storing one instruction. When an instruction is inserted into a slot, the slots with valid instructions inform the inserting slot whether the inserting instruction is dependent upon them. The inserting instruction can therefore determine its priority instruction and can wait until these priority instructions execute before it is launched. In the preferred embodiment, the queue fetches and retires four instructions per cycle and the queue has 56 slots.

The recovery method 10, in general, ensures that after an instruction cache misses, the instruction and any of its dependent instructions are reexecuted. The method 10 comprises a first step 12 of executing or reexecuting an instruction at which time the tag number for the instruction is driven on a tag bus. The tag number is driven so as to inform all other instructions that it is being launched.

At step 14, all of the instructions in the machine will next compare this tag number of the executing instruction with the tag numbers stored for its priority instruction or instructions. This comparison is performed so that the instructions in the slots can determine whether their priority instructions have executed thereby freeing them for execution. If a match does not occur between the tag number of the instruction executing and one of the tag numbers of the priority instructions, then operation returns to step 12 for the next instruction.

When a match does occur between the tag number of the instruction executing and a priority instruction, operation will then proceed to step 16. At step 16, an inquiry is made as to whether all dependencies have been satisfied. The dependencies are not limited to just dependencies upon other instructions but also include other dependencies, such as a carry/borrow dependency. The method 10 then proceeds to step 18 if all dependencies are satisfied and otherwise returns to step 12 with the next instruction.

At step 18, a flag is set in the slot to indicate that the instruction in the slot is ready to execute. The flag preferably comprises a bit in the instruction queue associated with the slot. By setting the flag, an execution part of the out-of-order machine is informed that the instruction is ready to be launched.

A novel aspect of the recovery method 10 according to the invention is that operation does not terminate with step 18 but rather returns to step 12. Thus, even after all dependencies for an instruction have been cleared and the instruction is waiting to be launched or has already launched, the instruction still monitors the instructions that are being executed. If, at step 14, an instruction in the queue determines that the tag number for an executing instruction matches the tag number for one of its priority instructions, then the instruction in the queue will check that all dependencies have cleared and then once again set the flag to indicate that it is ready to launch.

With the recovery method 10 according to the invention, only those instructions which are dependent upon an instruction which has cache missed will reexecute. In other words, only a dependency chain of instructions will reexecute. The dependent instructions will detect that the cache missed instruction has reexecuted at step 12 and will therefore reset their flag at step 18 so as to reexecute themselves.

The recovery method 10 according to the invention provides optimal performance for the out-of-order execution machine. The machine need not stall the execution of an instruction until the data has arrived but can instead speculatively execute the instruction on the assumption that the data will be available. Since the wait states are eliminated, the speed and thus performance of the machine can be significantly increased.

A recovery method 20 according to a second embodiment of the invention, as shown in FIG. 2, comprises a step 22 of executing or reexecuting an instruction and driving the tag number of the instruction on the tag bus. At step 23, each slot with a valid instruction in the queue compares the tag number of the executing instruction with the tag number for each of its priority instructions. With no match between tag numbers, processing returns to step 22 and waits for the next executing instruction. If, on the other hand, a match occurs, a determination is next made at step 24 as to whether all dependencies are satisfied. After all dependencies have cleared, the flag is set at step 25 to indicate that the instruction is ready to launch and processing ends at step 26.

The recovery method 20 differs from the recovery method 10 in that each instruction in the queue monitors whether a priority instruction has cached missed. As shown in FIG. 2, the method 20 comprises a step 27 of waiting one or more states followed by a step 28 of determining whether a cache miss has occurred for the priority instruction. If a cache miss does not occur, thereby indicating that the priority instruction need not be reexecuted, then processing ends at step 26. When a cache miss does occur, then the instruction must reexecute and, accordingly, the flag is cleared at step 29 to indicate that the instruction is not ready to launch. The processing then returns to step 22 to detect when the priority instruction has reexecuted.

The recovery method 20 is similar to the recovery method 10 in that the recovery method 20 also does not wait until it is known for certain whether the data will be available. Instead, the recovery method 20 involves speculatively executing instructions and therefore has a relatively fast performance.

The recovery method 10, however, has advantages over the recovery method 20 and is therefore the preferred recovery method. With recovery method 20, each instruction must watch the cache miss bus and would require extra memory elements for storing whether its priority instructions have cache missed. The recovery method 20 would thus require extra logic elements for the added comparisons and would overall require extra work which would be performed by an additional state machine.

Figure 3:
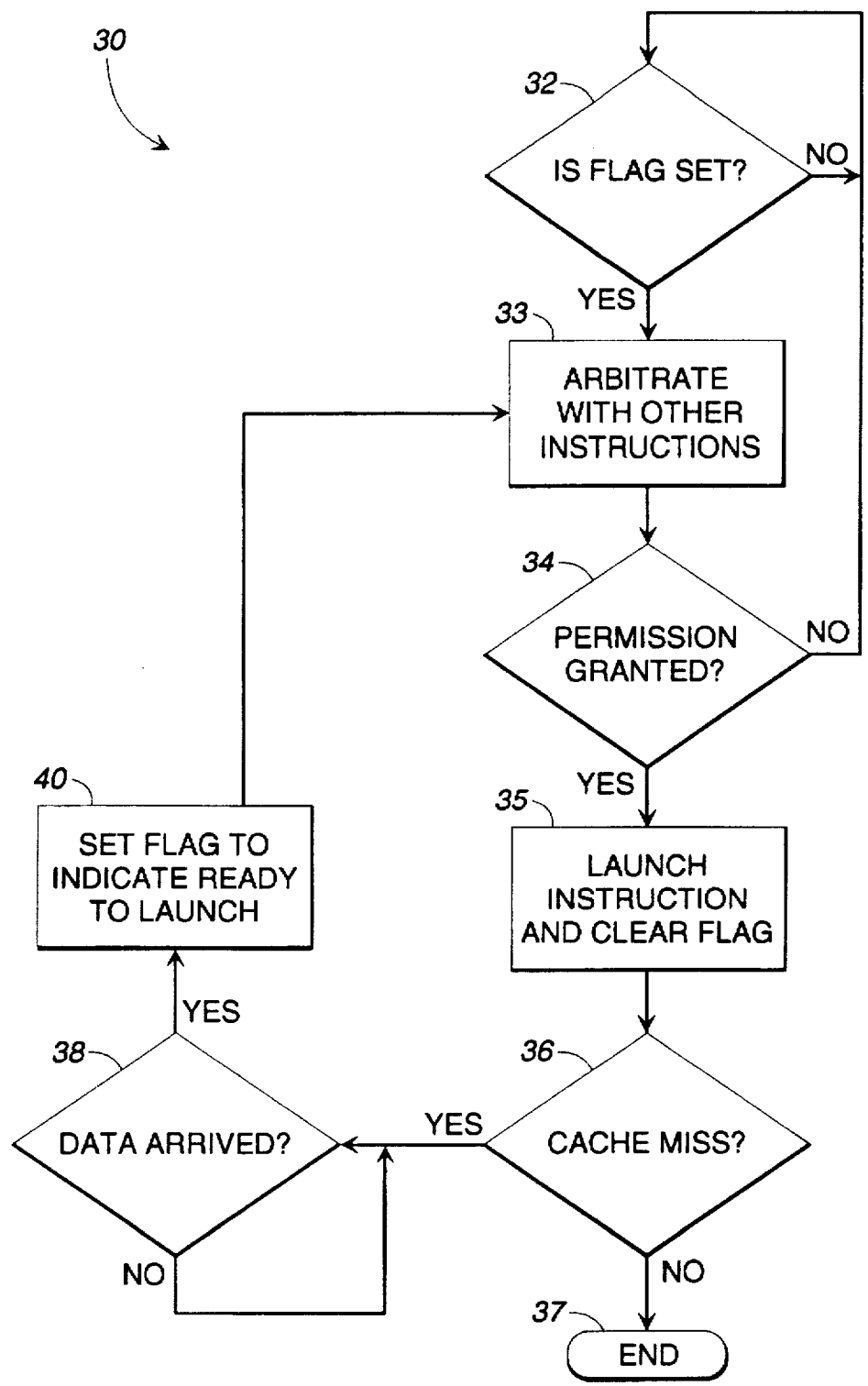
FIG. 3 is a flow chart illustrating a method for launching instructions according to a preferred embodiment of the invention.

A method 30, shown in FIG. 3, is performed by another portion of the out-of-order execution machine and depicts a process for executing the instructions stored in the instruction queue. The method 30 comprises a step 32 for determining whether the flag for a particular instruction is set indicating that the instruction is ready to launch. As described above with regard to methods 10 and 20, this flag is set after all dependencies for the instruction have cleared. The processing remains at step 32 until the flag for the instruction is set.

Once the flag for the instruction is set, the instruction is arbitrated with the other instructions at step 33. The arbitration is necessary since more instructions may be ready to launch than the machine is capable of launching. The processing loops back to step 32 until permission for the instruction is granted at step 34.

After permission has been granted at step 34, the instruction is launched at step 35 and the flag indicating that the instruction is ready to launch is cleared. At step 36, processing is delayed a state to determine whether the instruction cache missed. If the instruction did not cache miss, then processing may end at step 37. If, on the other hand, the instruction did cache miss, then processing waits at step 38 until the data has arrived from main memory. The flag indicating that the instruction is ready to launch is reset at step 40 and then the instruction is arbitrated with other instructions at step 33.

It should be understood that the steps shown in FIGS. 1 to 3 do not necessarily occur in sequential steps. In other words, each step in the methods 10, 20, and 30 does not necessarily represent a unique state during the clock cycle separate and distinct from the other steps in the methods 10, 20, and 30. Instead, one or more steps may occur during the same state and one step may occur over more than one state.

A diagram of a slot according to a preferred embodiment of the invention is shown in FIG. 4. Each slot has a slot number (Slot #) uniquely identifying that particular slot and further has a target register (target reg) for storing a general register number where the instruction in the slot writes the outcome of the instruction. Each slot also stores the slot numbers of the instructions that have written or will write the source registers (source_1tag, source_2tag, and source_3tag) and the target register (target_tag) before the instruction executes. These source registers, as discussed above, track the dependencies between instructions. In addition to the source registers, each slot also has memory elements (C/B/V SAR) for tracking dependencies on carry/borrow, V-bit, SAR, as well as some other control operations. Finally, each slot is associated with a number of control bits for dependency tracking, arbitration for launch, and other general control functions.

An example of a circuit for performing the methods 10, 20, and 30 will now be described with reference to FIGS. 5 to 9. It should be understood that the circuits shown in FIGS. 5 to 9 are just examples of how the methods 10, 20, and 30 may be implemented and that the methods 10, 20, and 30 may be implemented in various other ways which will be apparent to those skilled in the art.

With reference to FIG. 5, a circuit 50 compares source registers for the instructions inserting with the target register for a particular slot. Since each inserting instruction typically has two operands, each slot has a circuit similar to circuit 50 for comparing the other source registers of the inserting instructions with the target register of the slot. If a match occurs between the slot's target register and a source register of one of the inserting instructions, the slot informs the one inserting instruction that the inserting instruction depends on it for the operand data. As a result, circuit 50 allows inserting instructions to determine their dependencies on other instructions.

In the preferred embodiment, a quad of instructions are inserted at one time and each instruction has operand fields B and X and writes to a target register T. The circuit 50 receives the B field operands of the inserting instructions and inputs the source registers D_REG_B0 to D_REG_B3 to a set of comparators 52a to 52d, respectively. Each comparator 52a to 52d also receives the target register T_REG for its slot and compares the target register T_REG with each of the inserting source registers D_REG_B0 to D_REG_B3. In general, if a match occurs, a match signal MAT_B0 to MAT_B3 will be latched by a set of latches 54a to 54d and an AND gate 56a to 56d associated with the matched inserting instruction outputs an enable signal en_B0 to en_B3.

For instance, if the comparator 52c determines that the source register D_REG_B2 for the inserting instruction is equal to the target register T_REG for its slot, then the comparator 52c will output a signal which is latched by latch 54c as a match signal MAT_B2. If that slot further has a valid instruction and is the most recent writer for that target register, then AND gate 56c will output an enable signal en_B2.

Figure 6A:
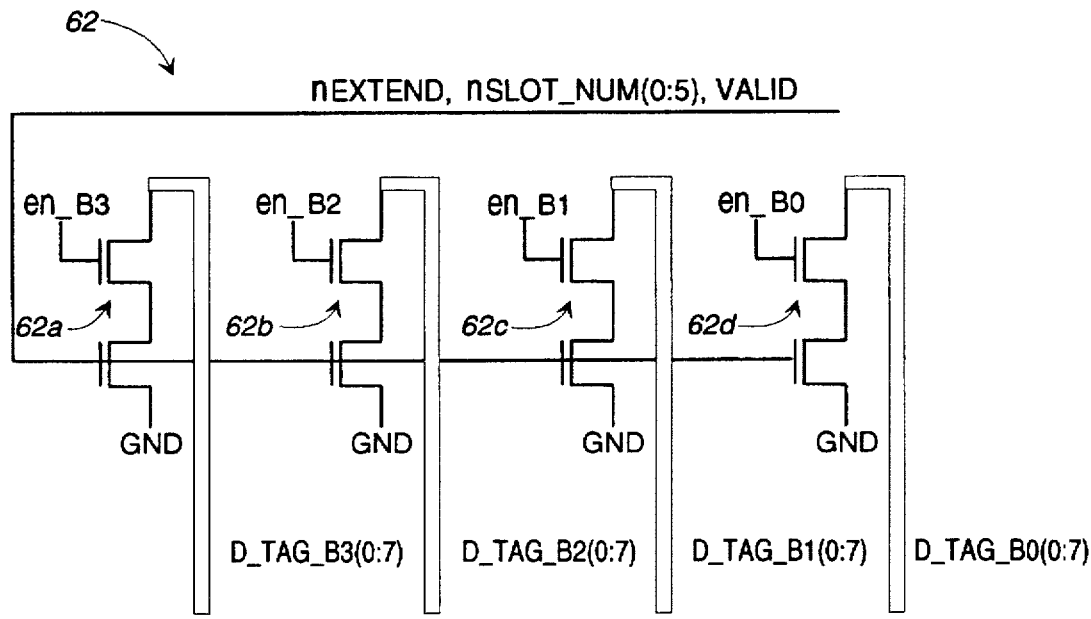
FIGS. 6(A) and 6(B) are circuit schematic illustrating sets of ROM drivers.
Figure 6B:
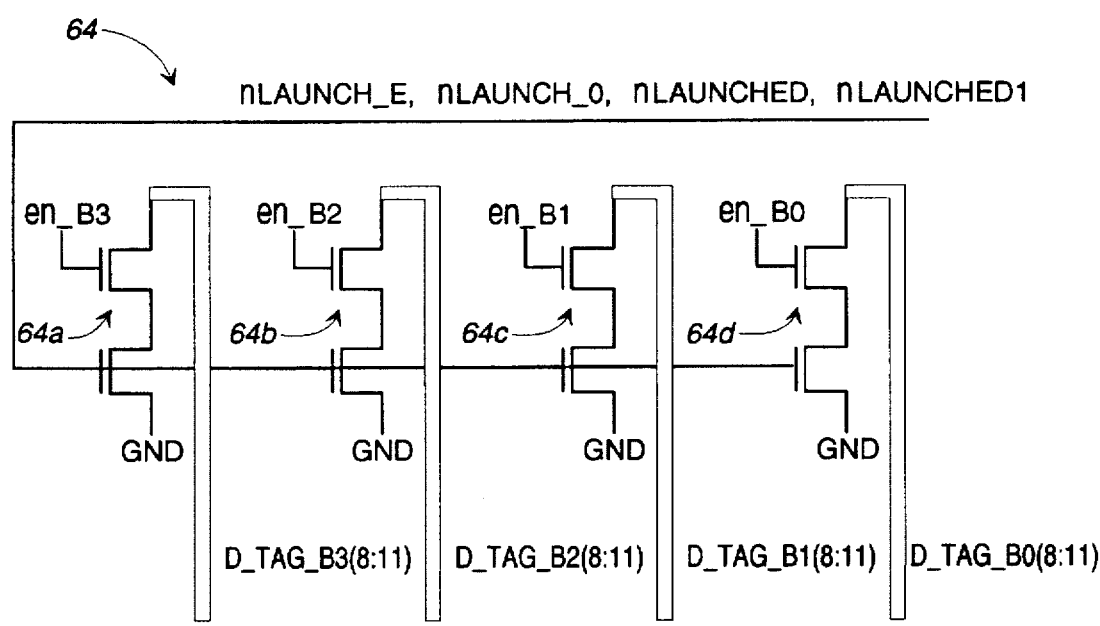

With reference to FIGS. 6(A) and 6(B), the enable signals en_B0 to en_B3 are input to a set of ROM drivers 62 and also to a set of ROM drivers 64. The ROM drivers 62 and 64 drive a tag bus with information directed to one of the slots. If a match occurs between a slot and an inserting instruction, such as instruction 2, then the ROM drivers 62c associated with the slot will drive the slot's number on the tag bus D_TAG_B so as to inform the inserting instruction that it is dependent upon that slot for its source register B.

Figure 7:
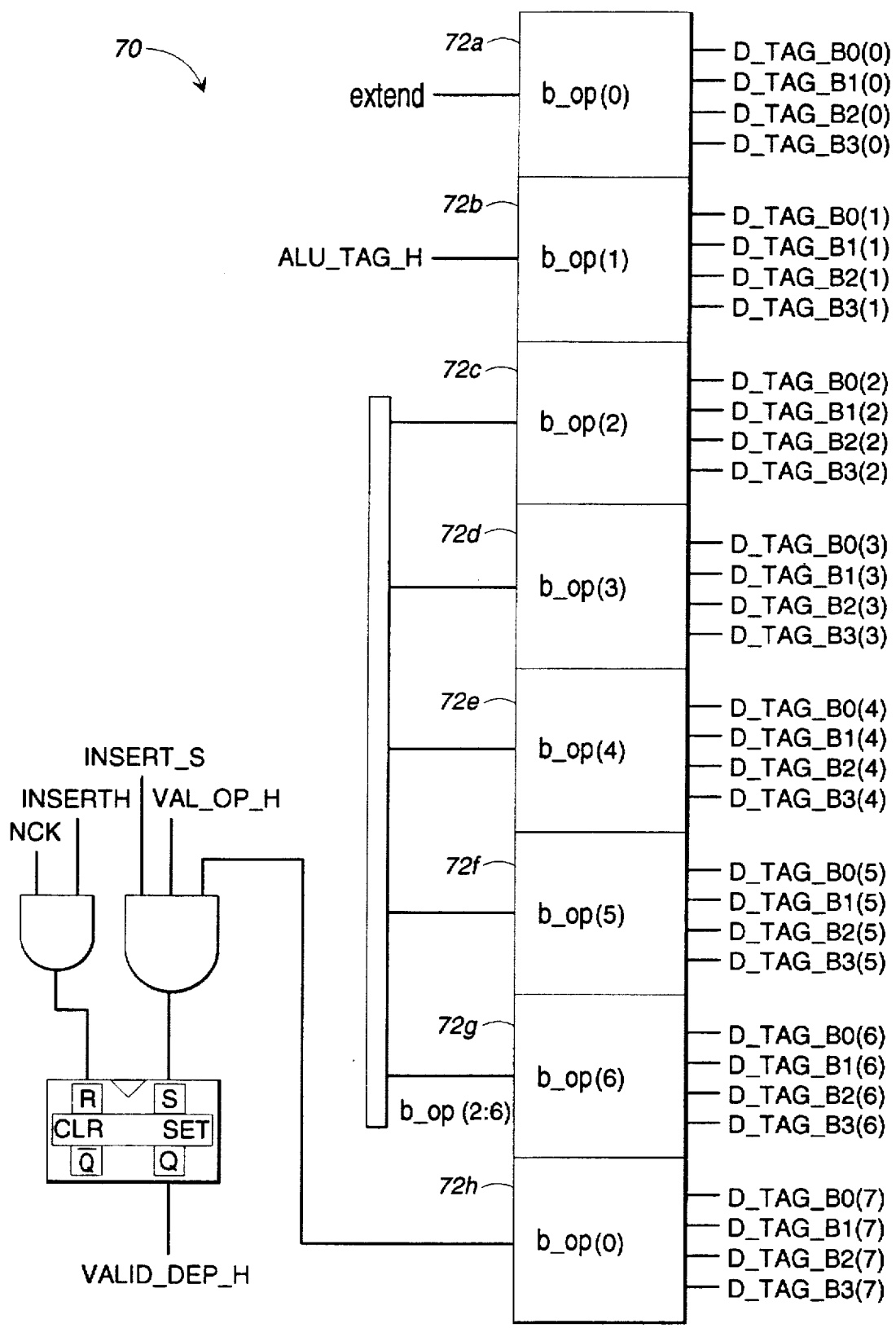
FIG. 7 is a schematic of a circuit storing a tag number of a priority instruction.

FIG. 7 depicts a circuit 70 for storing the slot numbers for priority instructions. The circuit 70 comprises a number of registers 72 which are connected to tag buses D_TAG_B0 to D_TAG_B3. The circuit 70 for a slot which is inserting an instruction receives the slot number of its priority instruction for its B field operand over one of the tag buses D_TAG_B0 to D_TAG_B3 and stores the slot number for its priority instruction in registers 72.

For instance, if slot number 10 determines with its circuit 50 that inserting instruction 2 depends upon slot 10 for the instruction's B field operand, then slot number 10 will drive its slot number on tag bus D_TAG_B2. The circuit 70 associated with the inserting instruction 2 receives slot number 10 over tag bus D_TAG_B2 and stores slot number 10 in registers 72. In a similar manner, each inserting instruction also stores the slot number for the X field operand in a separate set of registers.

Figure 8A:
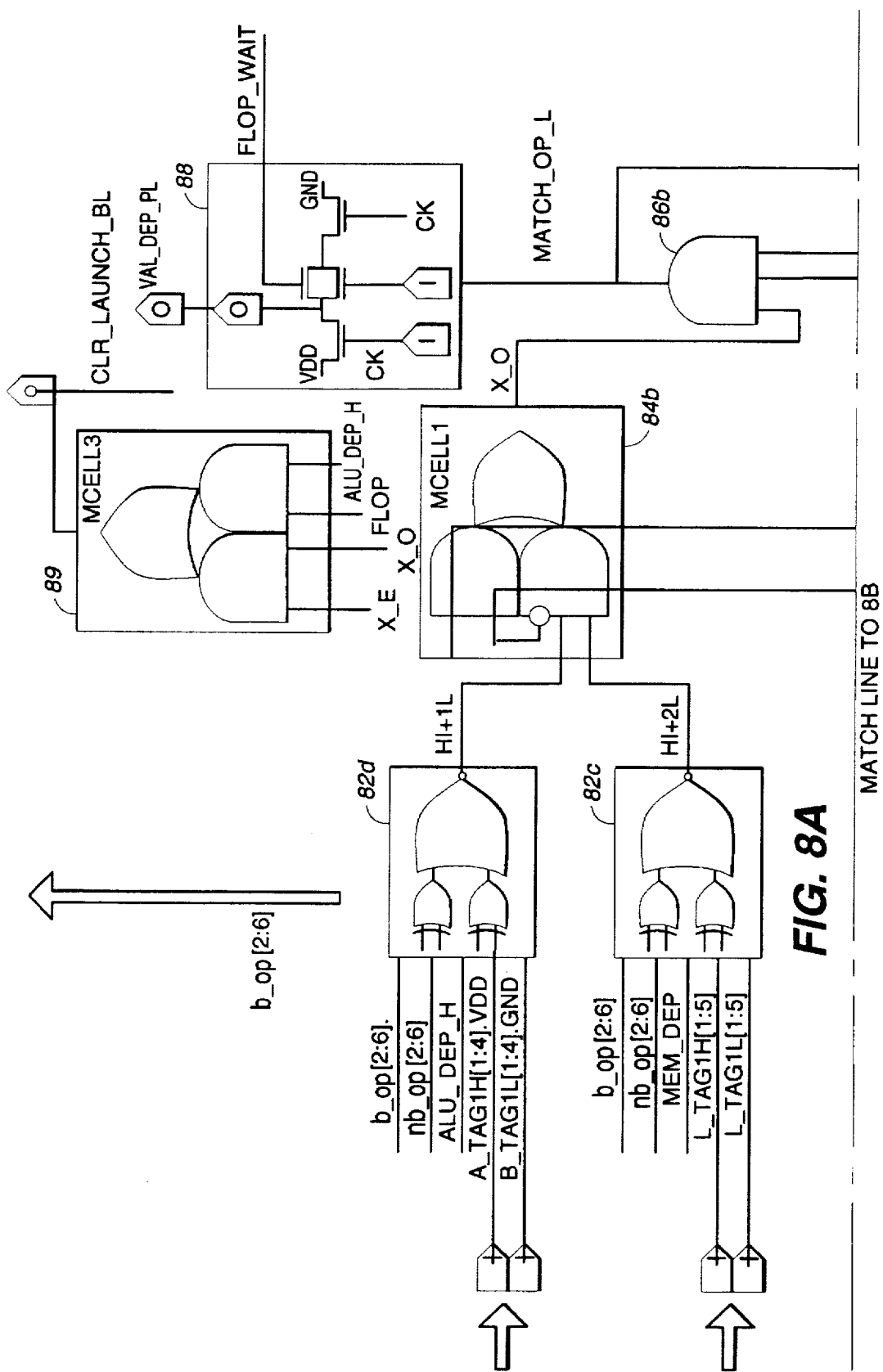
FIG. 8 is a schematic of a circuit associated with monitoring launched instructions.
Figure 8B:
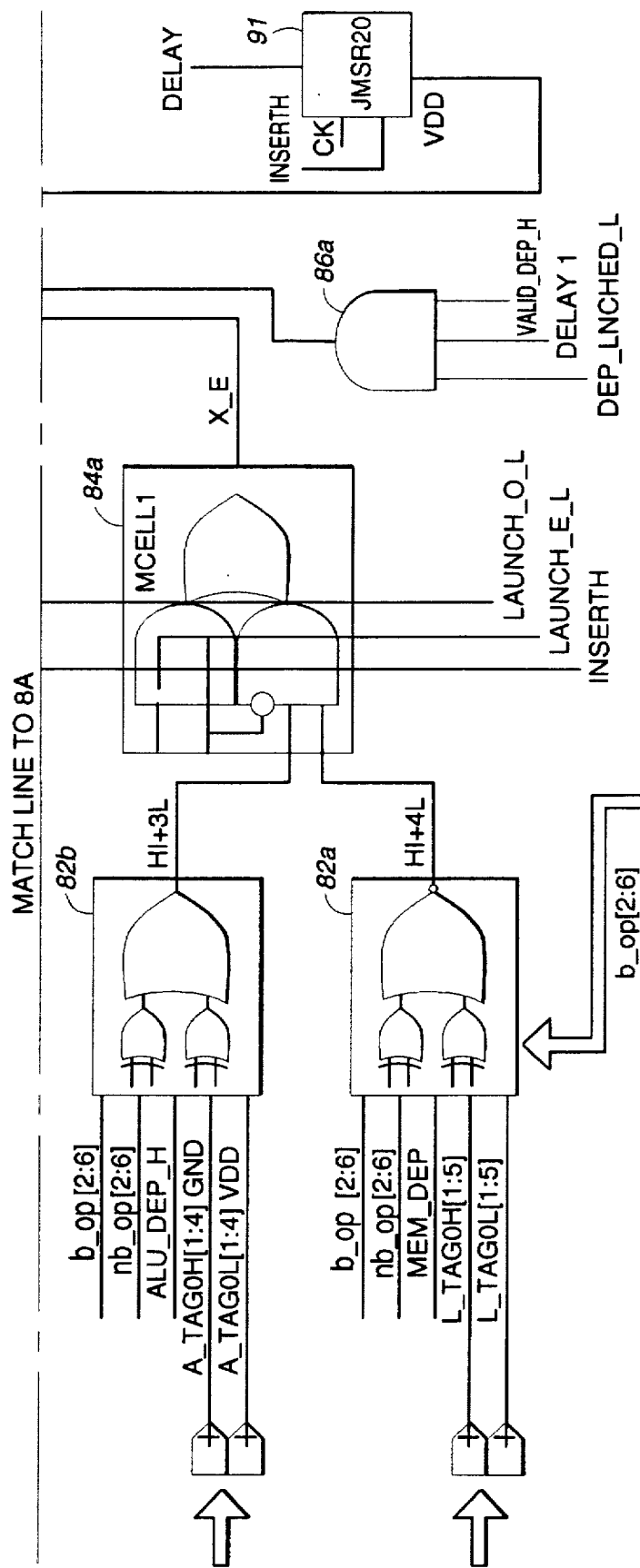

A circuit 80, shown in FIG. 8, sets and resets the flag for indicating whether an instruction is ready to launch. The circuit 80 comprises a set of comparators 82 for determining whether a launched instruction has the same tag number as one of the priority instructions for a slot. Two of the comparators 82a and 82c determine whether the tag number of a launched instruction L_TAG in a memory half of the queue is equal to a tag number b_op for its priority instruction and the other two comparators 82b and 82d determine whether the tag number of a launched instruction A_TAG in an ALU half of the queue is equal to the priority instruction b_op. It should be understood that each slot has a similar circuit for determining whether a launched instruction is equal to its priority instruction for its X field operand.

The comparators 82 will output a high signal as long as match does not occur between a launched instruction and the slot number stored for a priority instruction. Thus, when none of the comparators 82 find a match, each of the outputs hit1l, hit2l, hit3l, and hit4l will be high. On the other hand, when a match does occur, the comparator 82 finding the match will output a low signal.

The outputs hit1l and hit2l of the comparators 82d and 82c, respectively, are routed to two inputs of an AND gate within logic circuit 84b while outputs hit3l and hit4l of comparators 82b and 82a are routed to two inputs of an AND gate in logic circuit 84a. The outputs X_E and X_O of logic circuits 84a and 84b are input into AND gate 86b which has its output connected to a pull down circuit 88. The output VAL_DEP_PL of the pull down circuit 88 indicates whether the dependency on the B field operand has been cleared. A low value of the output VAL_DEP_PL indicates that the dependency has not cleared while a high value of the output VAL_DEP_PL indicates that the dependency has cleared.

In operation, as long as no match occurs at any of the comparators 82, all outputs hit1l to hit4l will remain high and the outputs X_E and X_O of logic circuits 84a and 84b will also remain high. Thus, with no match, the output MATCH_OPL of AND gate 86b will also be high which is fed into the pull down circuit 88. The pull down circuit 88 pulls the potential of the output VAL_DEP_PL to ground when the signal MATCH_OPL is high. Consequently, when no match is detected, the signal VAL_DEPL indicates that the dependency has not cleared.

In contrast, if a match occurs at any one of the comparators 82, the output X_E or X_O will change to a low value thereby triggering the output MATCH_OPL of AND gate 86 to a low value. The output MATCH_OPL is fed back through a delay 91 and into an AND gate 86a whereby once the signal MATCH_OPL goes low the signal MATCH_OPL remains low until the next instruction is inserted into that particular slot. With the signal MATCH_DPL being low, the pull down circuit 88 is disabled whereby the line VAL_DEP_PL will not be discharged to ground but rather will remain high. This high value of the signal line VAL_DEP_PL indicates that the dependency on the B field operand has cleared. The operation of another circuit, similar to circuit 80, for monitoring the launching of the priority instruction for the X field operand should be apparent and, accordingly, will not be described in further detail.

The signal line VAL_DEP_PL indicating the dependency for the B field operand is sent through an AND gate (not shown) which also receives signal lines indicating the other dependencies, such as the X field dependency. Once all dependencies have cleared, each of the inputs to the AND gate will be high and a launch ready signal is set high. This launch ready signal for the instruction is the flag which is set to indicate that the instruction is ready to execute.

The circuit 80 further has a circuit 89 for clearing the launch ready signal when a subsequent match is detected between the tag number for a slot's priority instruction and the launched instruction. The circuit 89 has a two input AND gate for receiving the outputs X_E and X_O from the logic circuits 84a and 84b. If a match is detected at any of the comparators 82, one of the outputs X_E or X_O will go low whereby an output CLR_LAUNCH_DL of the circuit 89 will also go low. A low value of the output CLR_LAUNCH_DL indicates that the launch bit must be cleared, thereby indicating that the instruction is ready to reexecute.

In summary, circuit 50 detects the slot numbers of dependent instructions for a particular slot in the instruction queue. This particular slot in the queue transmits its slot number with ROM drivers 62 and the slot which is receiving the inserting instruction stores this slot number in registers 72 with circuit 70. The slot which has just inserted monitors the launch bus with circuit 80 and clears the dependencies after both of its priority instructions have launched. At this time, the instruction is ready to launch. After the instruction executes, the launch signal line is reset to indicate that the instruction is not ready to launch. If one of the priority lines X_E or X_O goes low, then the output CLR_LAUNCH_DL of circuit 89 goes low so as to indicate that the instruction is ready to launch.

With the invention, a recovery method and system are provided which enables an instruction queue to work at an optimal speed. The method and system does not require a large number of extra logic gates and additional hardware but rather relies on existing circuitry. For instance, the comparators 82 for detecting when a priority instruction has launched are also used to detect when a priority instruction has relaunched. The method and system according to the invention thus provides a simple and quick approach for recovering from cache misses.

The foregoing description of the preferred embodiments of the invention has been presented for purposes of illustration and description. It is not intended to be exhaustive or to limit the invention to the precise forms disclosed. Many modifications and variations are possible in light of the above teaching.

The embodiments were chosen and described in order to explain the principles of the invention and their practical application to thereby enable others skilled in the art to utilize the invention and various embodiments and with various modifications as are best suited to the particular use contemplated. It is intended that the scope of the invention be defined by the claims.

Wherefore, the following is claimed:

1. A recovery method for use in an instruction queue having slots capable of storing instructions, comprising the steps of:

executing a first instruction and driving a first tag number identifying the first instruction on a tag bus;

comparing, at one of said slots containing a second instruction, said first tag number with a priority tag number, said priority tag number associated with a priority instruction which provides data for said second instruction;

clearing a dependency flag if said first tag number equals said priority tag number;

determining whether all dependencies for said second instruction have cleared;

setting a launch ready flag to indicate that said second instruction is ready to launch if all dependencies have cleared; and repeating said executing, comparing, clearing, determining, and setting steps with subsequent launched instructions after said launch ready flag is set wherein said launch ready flag is set again if said priority instruction reexecutes.

2. The method as set forth in claim 1, further comprising the steps of:

comparing, at said one slot, said first tag number with a second priority tag number, said second priority tag number associated with a second priority instruction which provides data for said second instruction; and clearing a second dependency flag if said first tag number equals said second priority tag number.

3. The method as set forth in claim 1, wherein said step of comparing comprises a step of comparing at each of a plurality of slots said first tag number with priority instructions associated with said slots.

4. The method as set forth in claim 1, wherein said step of executing comprises a step of simultaneously executing a plurality of instructions, said step of comparing comprises a step of comparing tag numbers for each of said plurality of instructions with said priority tag number, and said step of clearing comprises a step of clearing said dependency flag if the tag number for any one of said plurality of instructions matches said priority tag number.

5. A system for recovering from a cache miss, comprising:

a comparator circuit, associated with a slot in memory having a stored instruction, for generating a match signal when a launch tag number associated with a launching instruction equals a priority tag number associated with a priority instruction, said priority instruction providing data used by said stored instruction;

a dependency clearing circuit for receiving said match signal from said comparator circuit and for generating a dependency clear signal to indicate that the dependency of said stored instruction on said priority instruction has cleared; and a logic circuit for receiving said match signal from said comparator circuit and for setting a launch ready signal upon receipt of said match signal, said launch ready signal indicating that the stored instruction is ready to launch;

wherein said comparator circuit generates said match signal if said priority instruction reexecutes and said logic circuit resets said launch ready signal upon receipt of said match signal and following the reexecution of said priority instruction.

6. The recovery system as set forth in claim 5, wherein comparator circuit comprises a plurality of comparators for comparing said priority tag number to a plurality of launching tag numbers associated with a plurality of launching instructions, said comparator circuit generating said match signal if any of the launching tag numbers equals said priority tag number.

7. The recovery system as set forth in claim 5, further comprising:

a second comparator circuit, associated with the slot in memory having the stored instruction, for generating a second match signal when the launch tag number associated with the launching instruction equals a second priority tag number associated with a second priority instruction, said second priority instruction providing data used by said stored instruction; and a second dependency clearing circuit for receiving said second match signal from said second comparator circuit and for generating a second dependency clear signal to indicate that the dependency of said stored instruction on said second priority instruction has cleared;

wherein said logic circuit receives said second match signal and generates said launch ready signal upon receipt of either said match signal or said second match signal.

8. A recovery method for use in an instruction queue having slots capable of storing instructions, comprising the steps of:

executing a first instruction and driving a first tag number identifying the first instruction on a tag bus;

comparing, at one of said slots containing a second instruction, said first tag number with a priority tag number, said priority tag number associated with a priority instruction which provides data for said second instruction;

clearing a dependency flag if said first tag number equals said priority tag number;

determining whether all dependencies for said second instruction have cleared;

setting a launch ready flag to indicate that said second instruction is ready to launch if all dependencies have cleared;

ascertaining whether said second instruction has cache missed;

clearing said launch ready flag if said second instruction cache missed; and repeating said executing, comparing, determining, setting, ascertaining, and clearing steps with subsequent launched instructions until said second instruction is launched without a cache miss.

* * * * *